United States Patent [19]

Talwar

[11] Patent Number: 5,125,108
[45] Date of Patent: Jun. 23, 1992

[54] INTERFERENCE CANCELLATION SYSTEM FOR INTERFERENCE SIGNALS RECEIVED WITH DIFFERING PHASES

[75] Inventor: Ashok K. Talwar, Westlake Village, Calif.

[73] Assignee: American Nucleonics Corporation, Westlake Village, Calif.

[21] Appl. No.: 483,900

[22] Filed: Feb. 22, 1990

[51] Int. Cl.⁵ ........................ H04B 1/06; H01Q 21/00
[52] U.S. Cl. ................................. 455/278.1; 343/853
[58] Field of Search ............... 455/278, 272, 136, 273; 343/713, 841, 853

[56] References Cited

U.S. PATENT DOCUMENTS 3,699,444  10/1972  Ghose et al. ........................... 325/21
4,044,359   8/1977  Applebaum ........................... 343/100

OTHER PUBLICATIONS

"Collocation Of Receivers and High-Power Broadcast Transmitters, IEEE Transactions On Broadcasting" vol. 34, No. 2, Jun. 1988.

Primary Examiner—Curtis Kuntz
Assistant Examiner—Christine K. Belzer
Attorney, Agent, or Firm—Hoffmann & Baron

[57] ABSTRACT

An interference cancellation system for cancelling at least two interfering signals received simultaneously and which is adapted to be connected to a radio receiver system having a receiver antenna, a receiver and a receiver transmission line interconnecting the receiver antenna and the receiver includes an auxiliary antenna, a first directional coupler connected to the auxiliary antenna, a second directional coupler connected to the receiver transmission line, a synchronous detector connected to the first and second directional couplers, a signal controller connected the synchronous detector and a subtractor connected to the receiver transmission line and to the signal controller. The auxiliary antenna has a non-zero phase relationship for the two interfering signals relative to the receiver antenna. The auxiliary antenna is spaced apart from the receiver antenna a predetermined distance so that the two interfering signals are received by the two antennas with a phase difference which is equal and opposite to that which is introduced by the auxiliary antenna. As a result, the two interfering signals are received in the interference cancellation system in the same phase relative to the receiver antenna.

2 Claims, 2 Drawing Sheets

INTERFERENCE CANCELLATION SYSTEM FOR INTERFERENCE SIGNALS RECEIVED WITH DIFFERING PHASES

CROSS-REFERENCE TO RELATED APPLICATIONS

Reference is made to U.S. patent application entitled "Interference Cancellation System For Interference Signals Having An Arbitrary And Unknown Duration And Direction", by A. Talwar, filed Dec. 29, 1989, the disclosure of which is incorporated herein by reference.

BACKGROUND OF THE INVENTION

1. Field of the Invention

This invention relates to radio communication systems and methods, and more particularly relates to interference cancellation systems and methods for minimizing or eliminating interference in radio receivers due to unwanted signals. Even more specifically, this invention relates to a cancellation system and method for situations where two or more interfering signals are received at the auxiliary or reference antenna with differing phases, relative to the receiver antenna.

2. Description of the Prior Art

FIG. 1 is a functional diagram of a conventional interference cancellation system connected to a radio receiver system, shown generally as including a receiver antenna 2, a receiver 4 and a transmission line 6 interconnecting the receiver antenna 2 and the receiver 4. The interference cancellation system includes an auxiliary antenna 8, the purpose of which is to receive an RF sample of an interfering signal and to provide a reference signal for the interference cancellation system. This reference signal is used to detect the presence, amplitude and phase of the same interfering signal in the transmission line 6 between the receiver antenna 2 and the receiver 4, in the following manner.

A first coupler 10 is electrically connected to the auxiliary antenna transmission line 12 to provide a portion of the reference signal corresponding to the interfering signal received by the auxiliary antenna 8 to one input of a synchronous detector 14. A sample of the signal received on the receiver transmission line 6 is provided to a second input of the synchronous detector 14 by using a second coupler 16 connected to the receiver transmission line 6. The synchronous detector 14 thus compares a portion of the reference signal and the sample signal from the receiver transmission line 6, and provides output signals which vary in accordance with the differences and similarities in phase and amplitude of the reference and sample signals.

The output signals of the synchronous detector 14 are modified by respective integrators/amplifiers 18 to provide control signals which are provided to a signal controller 20. The reference signal is also provided, through an appropriate amplifier 22, to the signal controller 20. The signal controller 20 and the synchronous detector 14 thus define an adaptive control loop in the interference cancellation system such that the signal controller 20, driven by the control signals, adjusts the amplitude and phase of the reference signal and provides an adjusted cancellation signal. The cancellation signal is then injected into the receiver signal path defined by the receiver antenna 2, transmission line 6 and receiver 4 with equal amplitude but in a phase which is opposite to that of the interference signal, thereby cancelling the interfering signal in the receiver path. A third coupler, which is referred to as a subtractor 24 in FIG. 1, is used to inject the cancellation signal into the receiver signal path. The interference cancellation system automatically and continuously maintains the amplitude and phase of the cancellation signal for maximum cancellation.

When the direction of the desired signal is fixed, a directive antenna may be used for the receiver antenna. If the direction of the interference signal is arbitrary, then an omni-directional antenna is generally used for the auxiliary antenna 8.

In a conventional interference cancellation system, such as the type described above and illustrated by FIG. 1 of the drawings, the strongest signal received at the auxiliary antenna 8, be it the desired signal or the interfering signal, is cancelled since it dominates and controls the outputs of the synchronous detector 14. When the interfering signal arrives in the same direction as the signal of interest, both the interfering signal as well as the desired signal are cancelled. When only the desired signal is present, or when the desired signal is stronger than the interfering signal, the conventional interference cancellation system must be disabled in order to prevent cancellation of the desired signal.

Another disadvantage of the conventional interference cancellation system is that the auxiliary antenna 8 and the receiver antenna 2 must be spaced apart from one another so that there is a phase difference between the reference signal from the auxiliary antenna and the sample signal taken from the receiver antenna. This phase difference is necessary so that the adaptive control loop of the cancellation system, and in the particular the synchronous detector 14 of the loop, can distinguish between the two signals and provide a proper detector output signal to the signal controller 20.

DESCRIPTION OF THE INVENTION IN THE RELATED APPLICATION

U.S. patent application Ser. No. 458,901 entitled "Interference Cancellation System For Interference Signals Having An Arbitrary And Unknown Duration And Direction", by A. Talwar, filed Dec. 29, 1989, discloses an interference cancellation system which is not disabled when no interference signals are present.

Referring to FIG. 2 of the above-identified related application and the reference numerals used therein, the interference cancellation system disclosed in the related application is adapted to be connected to a radio receiver system having a receiver antenna 30, a receiver 32 and a receiver transmission line 34 interconnecting the receiver antenna 30 with the receiver 32. The interference cancellation system includes an auxiliary antenna 36 for receiving an interfering signal, a first directional coupler 38 connected to the auxiliary antenna 36, a second directional coupler 48 connected to the receiver transmission line 34, a synchronous detector 42 connected to the first and second directional couplers 38, 48, a signal controller 46 connected to the synchronous detector, a subtractor 52 connected to the receiver transmission line 34 and to the signal controller 46, an amplifier 44 interposed between the first coupler 38 and the signal controller 46, and integrators/amplifiers 50 interposed between the synchronous detector 42 and the signal controller 46.

The auxiliary antenna 36 used in the interference cancellation system exhibits a null in a narrow direction, which null is directed toward a desired signal and parallel with the boresight of the receiver antenna 30. The angle over which a signal is not cancelled depends on the maximum gain in the auxiliary signal path of the cancellation system, i.e., the gain from the auxiliary antenna 36, the first directional coupler 38, the amplifier 44, the signal controller 46 and to the subtractor 52. The angle over which cancellation does not occur decreases as the maximum gain in the auxiliary signal path is increased.

The interference cancellation system described above functions well in most situations. However, a special situation arises when two interfering signals arrive from opposite sides of the antennas 30, 36. An example of such a situation is when two signals arrive at +90° and −90° from the boresight of the receiver antenna 30. Some antennas which exhibit directional nulls in their antenna patterns that may be used as the auxiliary antenna 36 receive the two interfering signals in phases 180° apart relative to the receiver antenna 30. An example of such an auxiliary antenna is a loop antenna. Under such circumstances, if the two interfering signals received by the interference cancellation system have exactly equal amplitude and are in opposite phase with respect to the corresponding signals received by the receiver antenna, then the signals may not be cancelled. If the amplitudes of the two interfering signals are unequal, then the larger signal which is received may be reduced in amplitude, and the weaker signal may be enhanced.

OBJECTS AND SUMMARY OF THE INVENTION

It is an object of the present invention to provide a method and system for cancelling two interfering signals arriving from different directions when the auxiliary antenna used in the system has a 180°, or other non-zero phase relationship for the two interfering signals relative to the receiver antenna of a radio receiver system to which the cancellation system is connected.

In accordance with one form of the present invention, an interference cancellation system for connection to a radio receiver system having a receiver antenna, a receiver and a receiver transmission line interconnecting the receiver antenna with the receiver, includes an auxiliary antenna for receiving one or more interfering signals, the auxiliary antenna providing a reference signal corresponding to the interfering signals received by the auxiliary antenna, and a first directional coupler coupled to the auxiliary antenna and providing a first coupler output signal corresponding to the reference signal. An amplifier is coupled to the first directional coupler.

The interference cancellation system further includes a second directional coupler coupled to the receiver transmission line. The second directional coupler provides a sample signal corresponding to the interfering and desired signals received by the receiver antenna.

A synchronous detector is further included in the interference cancellation system. The synchronous detector has at least two inputs which are respectively effectively coupled to the first and second directional couplers so that the synchronous detector is provided with the first coupler output signal and the sample signal. The synchronous detector compares the first coupler output signal and the sample signal and provides at least one detector output signal. An integrator/amplifier is connected to the synchronous detector to integrate and amplify the detector output signal and to provide a control signal.

The interference cancellation system further includes a signal controller. The signal controller has a first input which is coupled to the output of the amplifier so that it receives an amplified version of the reference signal, and a least a second input which is electrically coupled to the output of the integrator/amplifier so that it receives the control signal from the integrator/amplifier.

The signal controller provides a cancellation signal which corresponds to the reference signal adjusted in phase and amplitude to cancel the interfering signal having the greatest magnitude and received by the radio receiver system. This cancellation signal is injected into the radio receiver system by a subtractor coupled to the receiver transmission line. The cancellation signal injected into the receiver signal path defined by the receiver antenna, transmission line and receiver, is equal in amplitude and opposite in phase to the interfering signal having the greatest magnitude and carried by the receiver transmission line so as to cancel the received interfering signal.

The auxiliary antenna used in the interference cancellation system is of the type which has a 180° or other non-zero phase relationship for at least two of the interfering signals relative to the receiver antenna. An example of such an antenna is a loop antenna.

In accordance with the present invention, the auxiliary antenna and the receiver antenna are spaced apart from each other a predetermined distance to introduce an opposite phase difference between the receiver antenna and the auxiliary antenna to that which was introduced by the auxiliary antenna. When the opposite phase difference introduced into the system by the spacing between the two antennas is combined with the non-zero phase relationship introduced by the auxiliary antenna, the two interfering signals are received in the same phase in the auxiliary signal path of the interference cancellation system relative to the receiver antenna. The signal controller phase setting for cancellation of the two interfering signals will then be the same, thereby improving the performance of the interference cancellation system relative to the two interfering signals.

These and other objects, features and advantages of this invention will be apparent from the following detailed description of illustrative embodiments thereof, which is to be read in connection with the accompanying drawings.

DETAILED DESCRIPTION OF THE PREFERRED EMBODIMENTS

Figure 1:
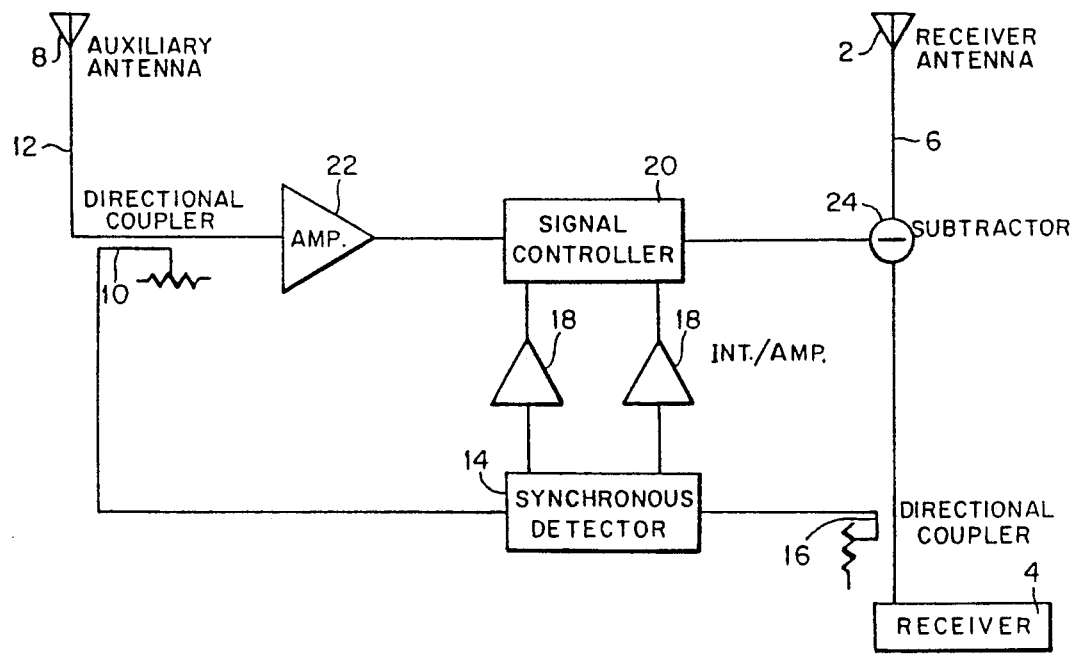
FIG. 1 is a functional block diagram of a conventional interference cancellation system.
Figure 2:
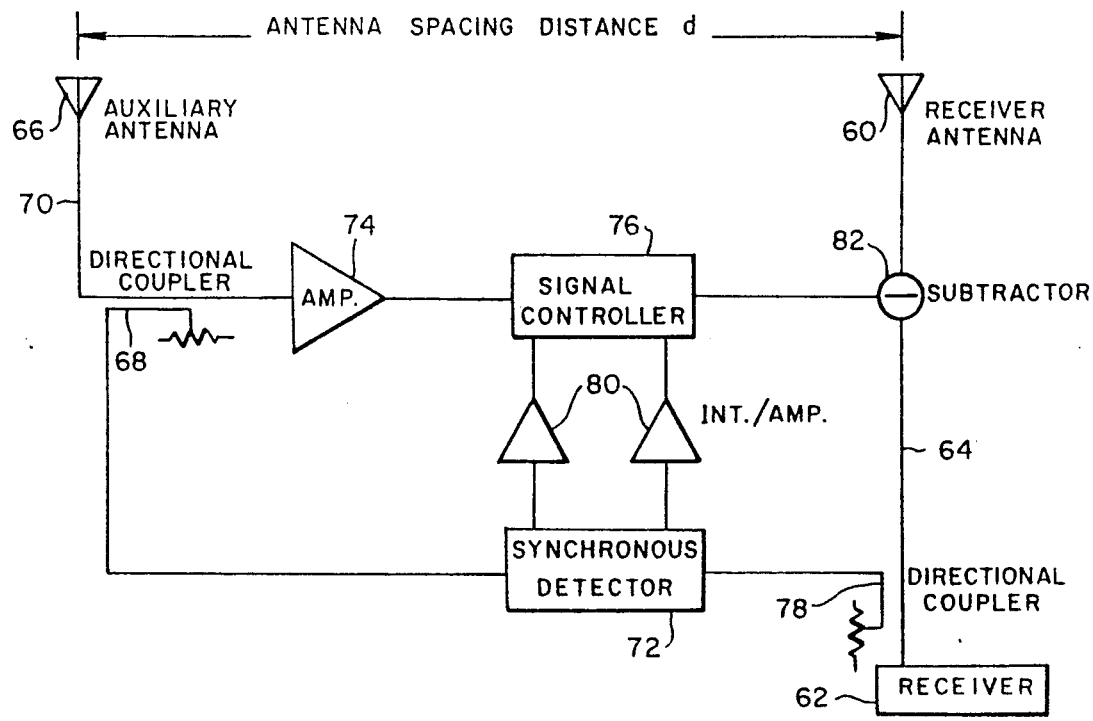
FIG. 2 is a functional block diagram of the interference cancellation system of the present invention.

FIG. 2 illustrates functionally one form of the interference cancellation system of the present invention.

The interference cancellation system is adapted to be connected to a radio receiver system having a receiver antenna 60, a receiver 62, and a receiver transmission line 64 connecting the receiver antenna 60 with the receiver 62. The receiver antenna 60 receives an interfering signal and a desired signal, as sometimes may occur when a receiver and a transmitter are collocated, which signals are provided to the receiver 62 by the transmission line 64.

The interference cancellation system includes an auxiliary antenna 66 for receiving an interfering signal. The auxiliary antenna 66 is connected to a first directional coupler 68 by a transmission line 70, and provides to the first directional coupler 68 a reference signal which corresponds to the interfering signal received by the auxiliary antenna 66. One output of the first directional coupler 68 is connected to an input of a synchronous detector 72. The other output of the first directional coupler 68 is provided to an amplifier 74, whose output is connected to the input of a signal controller 76. The first directional coupler 68 thus provides a portion of the reference signal to the synchronous detector 72, as well as to the signal controller 76 through the amplifier 74.

The interference cancellation system further includes a second directional coupler 78. The second directional coupler 78 is electrically coupled to the receiver transmission line 64, and has an output on which is provided a sample signal corresponding to the signals received by the receiver antenna 60.

As mentioned previously, the interference cancellation system includes a synchronous detector 72. The synchronous detector 72 has at least two input ports (i.e., a reference port and an error port) which are respectively electrically coupled to the outputs of the first directional coupler 68 and the second directional coupler 78 so that the reference signal and the sample signal are provided to the two input ports of the synchronous detector.

The synchronous detector 72 is basically a quadrature phase detector. A typical synchronous detector which is suitable for use is described in U.S. Pat. No. 3,699,444 which issued to Rabindra Ghose and Walter Sauter, the disclosure of which is incorporated herein by reference. The synchronous detector 72 compares the reference signal and the sample signal and provides one or more detector output signals.

The synchronous detector 72 may be regarded as a switch controlled by zero-crossing of the reference port signal of such a detector. Because the synchronous detector is referenced to the interference signal (i.e., the reference signal), a non-zero sample signal will cause the synchronous detector 72 to output a DC detector output signal. An amplifier and/or an integrator 80 may be included in the interference cancellation system and connected to the synchronous detector's output so that the DC output signals of the detector will be amplified and integrated to create control signals, which signals are provided to the signal controller 76 of the interference cancellation system.

A signal controller 76 suitable for use in the interference cancellation system of the present invention is described in U.S. Pat. No. 3,699,444, mentioned previously. In its simplest form, the signal controller consists of an in-phase and a quadrature-phase electronic attenuator, each being controllable by a respective DC control signal. One of its inputs is provided with a portion of the reference signal from the output of the first directional coupler 68. Another input of the signal controller receives the control signals from the amplifiers/integrators 80. An output of the signal controller is provided to a subtractor 82, or 180° hybrid, which subtractor is coupled to the receiver transmission line 64.

The signal controller 76 provides a cancellation signal to the subtractor 82 which, in effect, injects the cancellation signal into the receiver signal path defined by the receiver antenna 60, transmission line 64 and receiver 62 and, more specifically, onto the receiver transmission line carrying the desired and interfering signals.

Because the synchronous detector 72 is referenced to the interfering signal to be eliminated, the non-zero sample signal will result in DC signals at the outputs of the synchronous detector. The DC signals are amplified and integrated to create control signals for the signal controller 76 such that the values of gain and phase of the cancellation signal which is generated by the signal controller 76 change only when the sample signal is present. As the non-zero sample signal causes the control signals to change, the values of gain and phase of the cancellation signal change until such values become what are exactly required to drive the sample signal to zero. The cancellation signal which is injected into the receiver transmission line 64 is equal to and opposite in phase to the interfering signal received by the receiver antenna 60 and carried by the receiver transmission line 64 so as to cancel the received interfering signal.

The receiver antenna 60 may be of the directive type, such as a parabolic antenna. Accordingly, it has relatively significant gain, within a predetermined angle about its boresight. The receiver antenna 60 is pointed in a manner such that the desired signal arrives within the predetermined angle.

The auxiliary antenna 66 is chosen to exhibit a null in a fairly narrow direction. An example of such an antenna is a loop antenna (which has nulls in its antenna pattern which are diametrically opposite one another). The auxiliary antenna 66 is positioned such that the null in its antenna pattern is pointed in the direction of the desired signal, which is also the direction in which the receiver antenna 60 is directed, so that the centerline of the null of the auxiliary antenna 66 is substantially parallel to the boresight of the receiver antenna. Thus, the gain of the auxiliary antenna 66 and, consequently, of the auxiliary signal path from the auxiliary antenna 66 to the subtractor 82, automatically falls off within a predetermined angle of the boresight of the receiver antenna 60 such that no cancellation occurs within this predetermined angle.

The interference cancellation system of the present invention works well when a single interfering signal is received by the auxiliary antenna 66, or when multiple interfering signals are received. When multiple interfering signals are received by the auxiliary antenna, the strongest signal is cancelled, since it dominates the outputs of the synchronous detector 72.

However, a special situation arises when two interfering signals arrive from opposite sides of the auxiliary and receiver antennas. An example of this situation is illustrated by FIG. 3 of the drawings.

Figure 3:
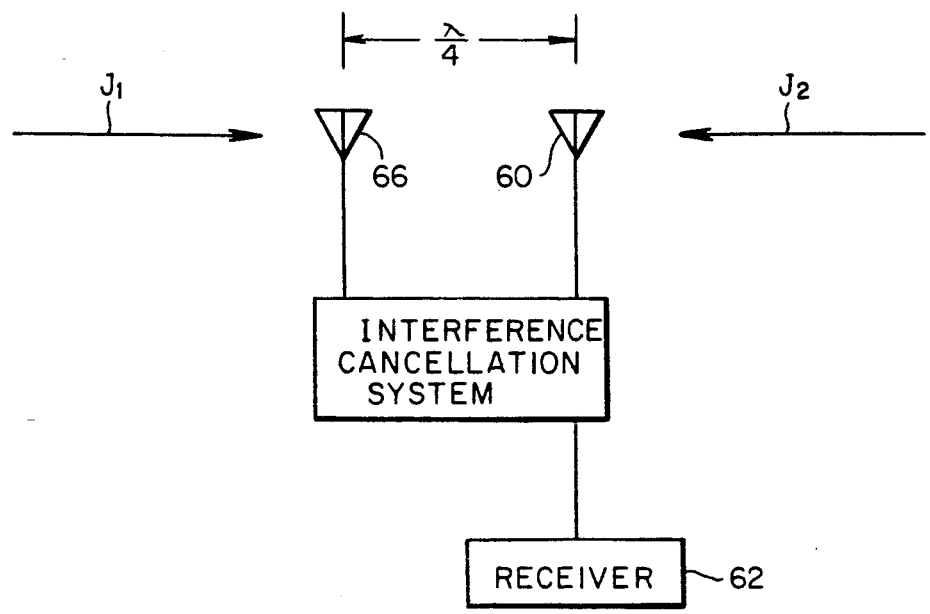
FIG. 3 is a pictorial illustration of an interference cancellation system formed in accordance with the present invention cancelling two interfering signals arriving from opposite directions (i.e., 180° apart).

As shown in FIG. 3, one interfering signal J1 arrives at an angle of $-90°$ from the boresight of the receiver antenna 60. Another interfering signal J2 arrives at an angle of $+90°$ from the boresight of the receiver antenna.

Some antennas, which exhibit a directional null in their antenna patterns, that are used for the auxiliary antenna 56, receive the two interfering signals J1, J2 in phases that are 180° apart relative to the receiver antenna 60. A loop antenna is one example of such an antenna.

More specifically, interfering signal J1 is received by the auxiliary antenna 66 and by the receiver antenna 60. However, due to the direction of the currents which are generated in the auxiliary antenna 66 by the signals received, the phase of the signal in the transmission line connecting the auxiliary antenna to the rest of the interference cancellation system (or in the auxiliary signal path of the cancellation system) will be −90° out of phase with respect to the signal in the receiver transmission line 64 (or in the receiver signal path) corresponding to the interfering signal J1 received by the receiver antenna 60.

Similarly, the signal impressed in the auxiliary antenna transmission line (or in the auxiliary signal path) corresponding to the interfering signal J2 received by the auxiliary antenna will be +90° out of phase with respect to the same signal in the receiver transmission line 64 (or in the receiver signal path) corresponding to the signal J2 received by the receiver antenna. Accordingly, the two interfering signals J1, J2 are received in the interference cancellation system in phases which are 180° apart relative to the receiver antenna 60.

Under the circumstances described above, if interfering signals J1, J2 have equal amplitudes, then the same signals received by the receiver antenna 60 may not be cancelled by the interference cancellation system. The signal controller 76 will sense the equal amplitudes of the two signals and will not provide a cancellation signal to the subtractor 82.

If the amplitudes of interfering signals J1, J2 are unequal, then the signal controller will provide a cancellation signal to the subtractor 82, which will subtract the cancellation signal from the larger of the interfering signals received by the receiver antenna 60, thereby reducing in amplitude the larger interfering signal. However, because the two interfering signals J1, J2 are 180° out of phase relative to the receiver antenna 60, the cancellation system will reduce the larger amplitude signal but may enhance the strength of the weaker interfering signal received by the receiver antenna 60.

In accordance with the present invention, and as illustrated by FIG. 3 of the drawings, a method for cancelling or reducing both interfering signals arriving from different directions when the auxiliary antenna 66 has a 180° or other non-zero phase relationship for the two interfering signals relative to the receiver antenna 60, includes the step of mounting the receiver and auxiliary antennas 60, 66 apart from each other a predetermined distance d so as to introduce an opposite phase relationship between the two interfering signals to that which was introduced by the auxiliary antenna.

More specifically, and as illustrated by FIG. 3, if two interfering signals J1, J2 arrive at angles of +90° and −90°, respectively, from the receiver antenna boresight, and the auxiliary antenna 66 used in the interference cancellation system receives the two signals in phases 180° apart relative to the receiver antenna 60, the distance d is chosen to be approximately equal to one-quarter of the wavelength λ of the interfering signals J1, J2. Accordingly, interfering signal J1 arrives at the receiver antenna 60 after it arrives at auxiliary antenna 66. This introduces an additional phase difference of 90° in the signal received by the auxiliary antenna relative to the receiver antenna. Interfering signal J2 arrives at the receiver antenna 60 at a phase which is 90° earlier than at the auxiliary antenna 66. Since signal J1 arrives 90° later at the receiver antenna, the total phase difference introduced between interfering signals J1, J2 due to the one-quarter wavelength spacing between the two antennas 66, 60 is 180°.

When the phase difference introduced by the spacing between the auxiliary and receiver antennas is combined with 180° phase introduced by the auxiliary antenna 66, the two interfering signals J1, J2 are received in the same phase in the auxiliary signal path of the interference cancellation system relative to the receiver antenna 60. Thus, the phase setting of the signal controller 76 for cancellation of the two interfering signals J1, J2 will be the same so that both interfering signals will be cancelled or reduced.

Figure 4:
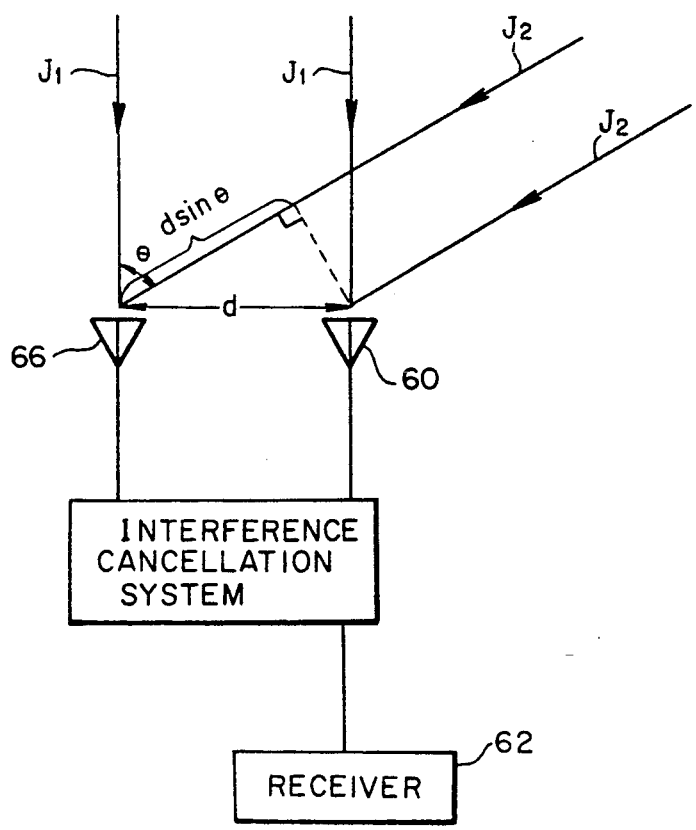
FIG. 4 is a pictorial illustration of an interference cancellation system formed in accordance with the present invention cancelling two signals arriving from angles other than 180° apart.

FIG. 4 illustrates how the interference cancellation system of the present invention may be adapted to cancel two interfering signals arriving at angles other than 180° apart, and illustrates how the predetermined distance d between the auxiliary antenna 66 and the receiver antenna 60 is to be determined so that any phase difference between the two interfering signals relative to the receiver antenna may be properly offset by a phase difference introduced between the signals due to the spacing between the auxiliary and receiver antennas.

In the example shown in FIG. 4, interfering signal J1 and interfering signal J2 arrive at each of the auxiliary antenna 66 and receiver antenna 60 at an angle θ between them. Here, the angle Θ is less than 180°.

The phase difference, Φ, between the two signals shown in FIG. 5 is given by:

$$\Phi = 2 \times \pi \times d \times \sin\Theta / \lambda \quad \text{(Eq. 1)}$$

Where λ is the wavelength of the interfering signals J1, J2.

Equation 1 was derived trigonometrically. One may use Equation 1 to determine the distance, d, for the spacing between the two antennas required to provide a phase "balance" between the signals received by the auxiliary and receiver antennas, if the phase difference, Φ, is known, or may use Equation 1 to determine the phase difference, Φ, which a given spacing between the two antennas will provide. Phase differences may be calculated similarly for other orientations and spacings between the receiver antenna 60 and the auxiliary antenna 66 so that the orientation and spacing between the antennas may be selected to achieve a high degree of cancellation for the two interfering signals, even if the two signals arrive from different directions and with different relative phases at the auxiliary and receiver antennas.

As is described above, the interference cancellation system of the present invention is adapted to cancel two interfering signals arriving from different directions when the auxiliary antenna of the cancellation system has a non-zero phase relationship for the two signals relative to the receiver antenna. By properly spacing and orienting the auxiliary antenna and the receiver antenna, the performance of the interference cancellation system with respect to mulitiple interfering signals is improved.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An interference cancellation system for connection to a radio receiver system having a receiver antenna, a receiver and a receiver transmission line electrically coupling the receiver antenna to the receiver, the interference cancellation system comprising:

an auxiliary antenna for receiving at least first and second interfering signals, the auxiliary antenna providing a reference signal corresponding to the first and second interfering signals received by the auxiliary antenna;

a first directional coupler, the reference signal being provided to the first directional coupler, the first directional coupler having first and second outputs and respectively providing thereon first and second output signals each corresponding to the reference signal;

a second directional coupler, the second directional coupler being electrically coupled to the receiver transmission line, the second directional coupler having an output and providing thereon a sample signal corresponding to at least the first and second interfering signals and a desired signal received by the receiver antenna;

a synchronous detector, the synchronous detector having at least two inputs respectively electrically coupled to the first and second directional couplers and being responsive to the second output signal of the first coupler and the sample signal of the second coupler, the synchronous detector comparing the first coupler second output signal and the sample signal and providing at least one detector output signal in response thereto;

a signal controller, the signal controller having a first input electrically coupled to the first directional coupler and being responsive to the first output signal of the first coupler, and at least a second input electrically coupled to the synchronous detector, the signal controller having an output and providing thereon a cancellation signal in response to the detector output signal; and a subtractor, the subtractor being electrically coupled to the receiver transmission line and being further electrically coupled to the signal controller, the subtractor having an input on which is provided the cancellation signal, the subtractor effectively injecting the cancellation signal onto the receiver transmission line carrying the received interfering and desired signals, the cancellation signal injected into the receiver transmission line being equal in amplitude and opposite in phase to at least one of the first and second interfering signals received by the receiver antenna and carried by the receiver transmission line so as to cancel at least the one interfering signal on the receiver line;

the auxiliary antenna having a non-zero phase relationship for the first and second interfering signals relative to the receiver antenna and thereby introducing a phase difference between the first and second signals relative to the receiver antenna;

the auxiliary antenna being spaced apart from the receiver antenna a predetermined distance such that the first and second interfering signals are received by the auxiliary antenna and the receiver antenna with a phase difference which is equal and opposite to that which is introduced by the auxiliary antenna, whereby the first and second signals are received in the same phase in the interference cancellation system relative to the receiver antenna.

2. A method for cancelling at least two interfering signals in a radio receiver system to which an interference cancellation system is connected, the radio receiver system having a receiver antenna, a receiver and a receiver transmission line electrically coupling the receiver antenna to the receiver, the interference cancellation system including an auxiliary antenna having a non-zero phase relationship for the two interfering signals relative to the receiver antenna and thereby introducing a phase difference between the two interfering signals relative to the receiver antenna, the method comprising the step of:

positioning the auxiliary antenna of the interference cancellation system and the receiver antenna of the radio receiver system in a spaced apart relationship by a predetermined distance so that the two interfering signals are received by the auxiliary antenna and the receiver antenna with a phase difference which is equal and opposite to that which is introduced by the auxiliary antenna, whereby the two interfering signals are received in the interference cancellation system in the same phase relative to the receiver antenna.

* * * * *